United States Patent [19]
Johnson et al.

[11] 3,752,225
[45] Aug. 14, 1973

[54] DUCT FOR HOT GAS

[75] Inventors: Douglas Johnson; Henry M. Mar, both of Indianapolis, Ind.

[73] Assignee: General Motors Corporation, Detroit, Mich.

[22] Filed: May 5, 1971

[21] Appl. No.: 140,487

Related U.S. Application Data

[62] Division of Ser. No. 42,679, June 2, 1970, Pat. No. 3,612,400.

[52] U.S. Cl. .................................. 165/47, 165/134
[51] Int. Cl. ............................................. F24h 3/00
[58] Field of Search ...................... 165/154, 134, 47

[56] References Cited
UNITED STATES PATENTS
3,156,298   11/1964   Gardiner et al. .................... 165/134

*Primary Examiner*—Charles Sukalo
*Attorney*—Paul Fitzpatrick and Jean L. Carpenter

[57] ABSTRACT

An exhaust duct for a turbofan engine. The exhaust duct wall is characterized by lightweight construction and arrangements for cooling the structure exposed to hot gas. The wall is lined by loosely fitted plates which are corrugated so as to tolerate differential expansion due to temperature differences.

3 Claims, 4 Drawing Figures

Patented Aug. 14, 1973
3,752,225
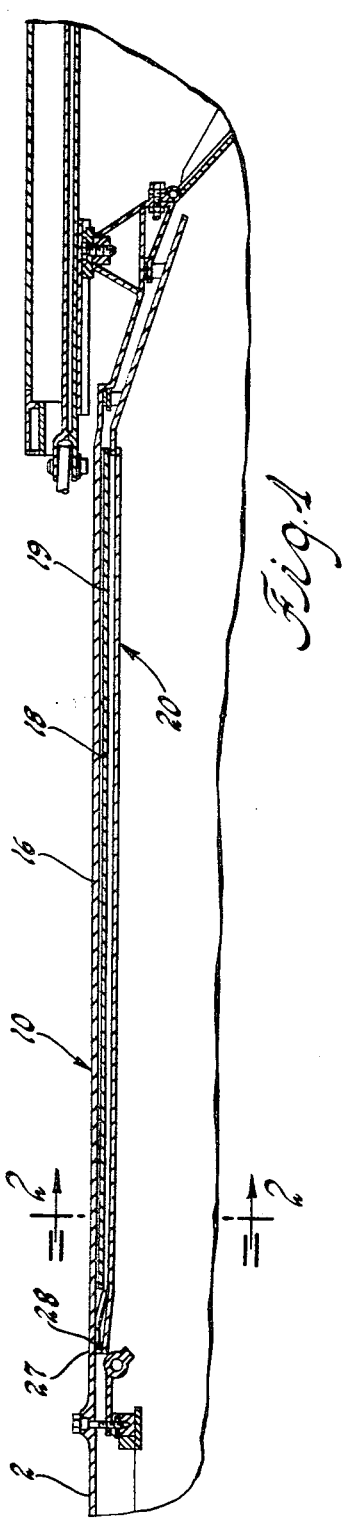
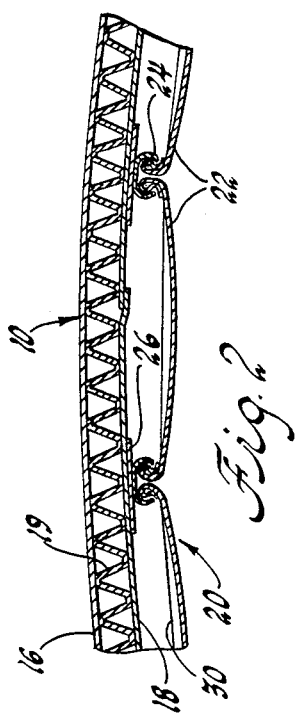
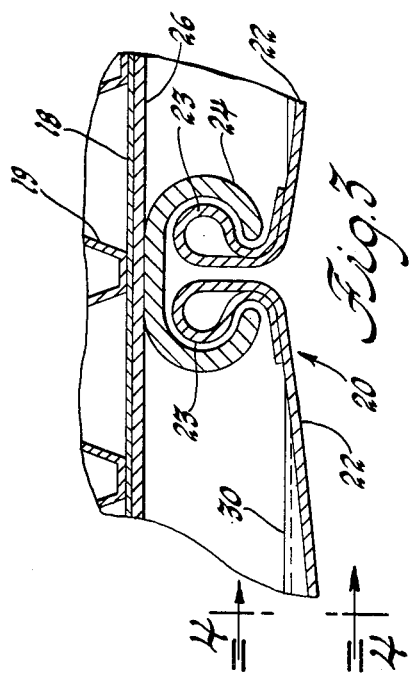
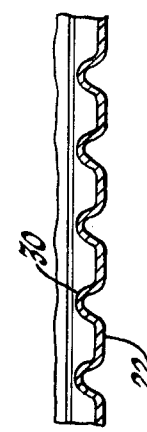
INVENTORS
Douglas Johnson
BY & Henry M. Mar
Paul Fitzpatrick
ATTORNEY

DUCT FOR HOT GAS

This application is a division of our application Ser. No. 42,679 filed June 2, 1970 [now U.S. Pat. No. 3,612,400].

Our invention relates to improved jet propulsion nozzles. The principal object of our invention is to improve means for cooling the walls of ducts carrying gases under high temperature.

Other objects and advantages of our invention will be apparent to those skilled in the art from the succeeding detailed description of the preferred embodiment of the invention and the accompanying drawings thereof.

FIG. 1 is a partial longitudinal sectional view of a cooled hot gas duct forming the casing of an afterburner of a jet engine.

FIG. 2 is a cross section of the afterburner casing wall taken on the plane indicated by the line 2—2 in FIG. 1.

FIG. 3 is a greatly enlarged fragmentary portion of FIG. 2.

FIG. 4 is a fragmentary sectional view taken on the plane indicated by the line 4—4 in FIG. 3.

Referring first to FIG. 1, this is a sectional illustration of an afterburner casing for a known type of jet propulsion engine which may be termed a by-pass turbojet or turbofan engine with duct burner, afterburner, and variable convergent-divergent nozzle. Such engines are well known and the details are immaterial to the present invention. Such an engine is described in our U.S. patent referred to above and in U.S. Pat. No. 3,528,250.

The portion 10 of the engine casing 2 downstream of the duct burner and afterburner (not illustrated) provides for completion of combustion and mixing of the hot gas from the fan and gas turbine, and carries it to a variable jet nozzle (not illustrated). Hot gases, with combustion continuing, flow downstream through the duct 10 to the nozzle.

Therefore, the duct wall 10 from a point just downstream of the burners is of a multiple-layer construction with provision for cooling to protect the wall against the very high temperature of the combustion gases within the duct 10. This structure, as shown in the figures, comprises an outer wall or facing 16, an inner wall or facing 18, and a corrugated core 19 resistance welded to the inner and outer walls. This provides an extremely lightweight structure of suitable strength to contain the gas pressure and resist gravity and acceleration loads. To give an idea of the nature of this structure, the overall thickness of the casing in a preferred 40-inch diameter embodiment is 0.28 inches, the outer wall is 0.012 inches thick, the inner wall 0.008 inch, and the core is of 0.005 inch material. This structure provides passages extending longitudinally of the casing between the walls 16 and 18 through which cooling air is fed to cool the jet pipe casing.

A feature of the invention is provision for additional shielding and cooling of the duct 10. The inner wall is shielded from radiation from and scouring by the hot gas and provided with a cover for cooling air flow inside inner wall 18 by a liner 20 made up of a number of parallel generally rectangular panels 22. As shown more clearly in FIG. 3, each panel 22 is provided with a folded-back and recurved flange 23 the margin of which may be seam welded to the face of the panel. The flanges 23 of two adjacent panels 22 are slidably received in a C-shaped channel 24 extending longitudinally of the casing 10 within which the flanges 23 have a somewhat loose-fitting dovetail engagement. Channels 24 may be welded to reinforcing strips 26 in turn welded to the inner wall 18.

Referring now to FIG. 1, the forward end of the lined or cooled casing structure 10 at 27 is open so that fan discharge air flowing along the engine casing 2 may enter the forward end of the casing wall 10 where it flows between the walls 16 and 18 and also between the facing 20 and the wall 18. This air is at slightly higher static pressure, about one or two pounds per square inch, than the hot propulsion gases inside the liner 20. Thus, the pressure of the cooling air tends to force the panels 22 inwardly. Since these are suspended from the outer wall, they are in tension, and there is no problem of providing a liner of sufficient strength to withstand a crushing pressure from the cooling fluid. The load of the cooling air pressure is taken in tension on each panel 22 and serves to hold the flanges 23 snugly against the channels 24. The relatively strong and rigid cylindrical outer casing takes the outward force of the compressed gas in tension and thus there is no particular problem with resisting this pressure.

The panels 22 are slidable in the channels 24 for installation and also to accommodate relative expansion. A suitable key or dowel 28 (FIG. 1) at the forward end of the casing 10 locates each panel 22 axially of the exhaust duct.

Another significant point about the liner panels 22 is the provision for differential expansion between the margins and median portions of the panels. In the particular structure illustrated, in which the liner 20 is about 30 inches long, the rear eleven inches suffers a very severe temperature gradient, this being where the exposure to hot gas is most severe. Since the flanges 23 are more protected from the hot gas than the central portion of panels 22, they tend to expand less. To provide for this, the rear portion of the face of each panel 22 has transverse corrugations 30 as indicated in FIGS. 3 and 4. The corrugations can fold slightly to accommodate the additional expansion in the central portion of the panels as compared to the margins.

It may be pointed out that approximately five percent of the engine air flow should be employed for cooling the casing 10 and, of this, approximately four-fifths is directed between the inner wall 18 and the liner 20.

We are aware of prior proposals to line the walls of hot gas ducts in U.S. Pat. Nos. 2,544,538; 2,913,873; and 2,955,415. However, these do not suggest the corrugated structure of the liner panels which significantly improves adaptability to high and varying temperatures of the gas flowing through the duct.

It will be clear to those skilled in the art from the foregoing description that the preferred embodiment of our invention provides a structure particularly suited to the requirements of practice making possible use of lightweight structures providing for efficient cooling of the exhaust duct.

The detailed description of the invention for the purpose of explaining the principles thereof is not to be considered as limiting or restricting the invention, since many modifications may be made by the exercise of skill in the art.

We claim:

1. A cooled annular duct for hot gas comprising, in combination, a casing having inner and outer spaced walls and means structurally connecting the walls so as to define a coolant fluid path between the walls, the casing being a pressure-containing duct structure; a liner spaced from the inner wall lining the interior of the casing, the liner comprising an annular array of panels, each panel extending axially of the duct; dovetail means slidably connecting the axially-extending lateral edges of the panels to the inner wall in side-by-side relation; and means for circulating a cooling fluid between the inner wall and the liner at slightly higher pressure than that of the hot gas so as to bias the liner panels away from the casing, the panels having corrugations extending in the direction from edge to edge of the panels to minimize stress due to temperature differentials between the edges and the intermediate portions of the panels.

2. A cooled annular duct for hot gas comprising, in combination, a casing having inner and outer spaced walls and means structurally connecting the walls so as to define a coolant fluid path between the walls, the casing being a pressure-containing duct structure; a liner spaced from the inner wall lining the interior of the casing, the liner comprising an annular array of panels convex on their inner sides, each panel extending axially of the duct; dovetail means including a channel on the inner wall and recurved flanges on the panels slidably connecting the axially-extending lateral edges of the panels to the inner wall in side-by-side relation; and means for circulating a cooling fluid between the inner wall and the liner at slightly higher pressure than that of the hot gas so as to put the panels in tension and bias the panels away from the casing, the panels having corrugations extending in the direction from edge to edge of the panels to minimize stress due to temperature differentials between the edges and the intermediate portions of the panels.

3. A cooled annular duct for hot gas comprising, in combination, a wall defining a pressure-containing hot gas duct structure; a liner spaced from the inner side of the wall lining the interior of the duct, the liner comprising an annular array of panels, each panel extending axially of the duct; dovetail means slidably connecting the axially-extending lateral edges of the panels to the duct wall in side-by-side relation; the panels having corrugations extending in the direction from edge to edge of the panels to minimize stress due to temperature differentials between the edges and the intermediate portions of the panels; and means for circulating a cooling fluid between the said wall and the liner at slightly higher pressure than that of the hot gas so as to bias the liner panels away from the wall.

* * * * *